United States Patent [19]
Howorth

[11] Patent Number: 5,853,675
[45] Date of Patent: Dec. 29, 1998

[54] COMPOSITE MOUNTING SYSTEM

[75] Inventor: Gary F. Howorth, St. Paul, Minn.

[73] Assignee: Minnesota Mining and Manufacturing Company, St. Paul, Minn.

[21] Appl. No.: 497,104

[22] Filed: Jun. 30, 1995

[51] Int. Cl.$^6$ .............................. B01D 50/00; F01N 3/24; B32B 5/16
[52] U.S. Cl. .................... 422/179; 422/171; 422/177; 422/221; 428/323; 428/324; 428/325; 252/378 R
[58] Field of Search ..................................... 422/177, 179, 422/180, 221, 222, 171; 60/299, 311, 322; 428/324, 325, 331, 428, 454, 920, 323; 55/495, 500, 502; 162/145, 152; 252/378 R

[56] References Cited

U.S. PATENT DOCUMENTS

| | | | |
|---|---|---|---|
| Re. 27,747 | 9/1973 | Johnson | 165/166 |
| 3,001,571 | 9/1961 | Hatch | 154/2.6 |
| 3,441,381 | 4/1969 | Keith et al. | 23/288 |
| 3,709,706 | 1/1973 | Sowman | 106/57 |
| 3,795,524 | 3/1974 | Sowman | 106/65 |
| 3,916,057 | 10/1975 | Hatch et al. | 428/236 |
| 4,047,965 | 9/1977 | Karst et al. | 106/65 |
| 4,048,363 | 9/1977 | Langer et al. | 428/77 |
| 4,064,359 | 12/1977 | Peterson et al. | 174/107 |
| 4,087,039 | 5/1978 | Balluff | 228/173 R |
| 4,156,533 | 5/1979 | Close et al. | 277/229 |
| 4,269,807 | 5/1981 | Bailey et al. | 422/179 |
| 4,305,992 | 12/1981 | Langer et al. | 428/324 |
| 4,331,621 | 5/1982 | Brockmeyer | 264/44 |
| 4,385,135 | 5/1983 | Langer et al. | 523/179 |
| 4,495,030 | 1/1985 | Giglia | 162/145 |
| 4,521,333 | 6/1985 | Graham et al. | 252/606 |
| 4,565,727 | 1/1986 | Giglia et al. | 428/377 |
| 4,617,176 | 10/1986 | Merry | 422/179 |
| 4,698,213 | 10/1987 | Shimozi et al. | 422/179 |
| 4,863,700 | 9/1989 | Ten Eyck | 422/179 |
| 4,865,818 | 9/1989 | Merry et al. | 422/179 |
| 4,866,107 | 9/1989 | Doxsee et al. | 523/153 |
| 4,904,343 | 2/1990 | Giglia et al. | 162/145 |
| 4,929,429 | 5/1990 | Merry | 422/179 |
| 4,929,502 | 5/1990 | Giglia | 428/357 |
| 4,951,954 | 8/1990 | MacNeill | 277/230 |
| 4,999,168 | 3/1991 | Ten Eyck | 422/179 |
| 5,008,086 | 4/1991 | Merry | 422/180 |
| 5,045,385 | 9/1991 | Luckanuck | 428/220 |
| 5,126,013 | 6/1992 | Wiker et al. | 162/156 |
| 5,137,656 | 8/1992 | Conner | 252/378 R |
| 5,139,615 | 8/1992 | Conner et al. | 162/145 |
| 5,151,253 | 9/1992 | Merry et al. | 422/179 |
| 5,207,989 | 5/1993 | MacNeil | 422/179 |
| 5,242,871 | 9/1993 | Hashimoto et al. | 501/95 |
| 5,250,269 | 10/1993 | Langer | 422/179 |
| 5,254,410 | 10/1993 | Langer et al. | 428/402 |
| 5,290,522 | 3/1994 | Rogers et al. | 422/179 |
| 5,332,609 | 7/1994 | Corn | 428/77 |
| 5,384,188 | 1/1995 | Lebold et al. | 428/283 |
| 5,385,873 | 1/1995 | MacNeill | 501/95 |
| 5,523,059 | 6/1996 | Langer | 422/179 |

FOREIGN PATENT DOCUMENTS

| | | |
|---|---|---|
| 0 319 299 | 6/1989 | European Pat. Off. . |
| 639 700 A1 | 2/1995 | European Pat. Off. . |
| 639 701 A1 | 2/1995 | European Pat. Off. . |
| 639 702 A1 | 2/1995 | European Pat. Off. . |
| 2 450 496 | 10/1980 | France . |
| 2 634 479 | 1/1990 | France . |
| 3514150 | 4/1985 | Germany . |
| 4194463 | 7/1992 | Japan . |
| 5164472 | 6/1993 | Japan . |
| 5-245324 | 9/1993 | Japan . |
| 1 513 808 | 6/1978 | United Kingdom . |
| 1 522 646 | 8/1978 | United Kingdom . |
| 1 604 908 | 12/1981 | United Kingdom . |
| 2 164 580 A | 3/1986 | United Kingdom . |

OTHER PUBLICATIONS

Stroom et al., "Systems Approach to Packaging Design for Automotive Catalytic Converters", Paper No. 900500, SAE Technical Paper Series, 1990.

Howitt, "Thin Wall Ceramics as Monolithic Catalyst Supports", Paper No. 800082, SAE Technical Paper Series, 1980.

Howitt et al., "Flow Effects in Monollithic Honeycomb Automotive Catalytic Converters", Paper No. 740244, SAE Technical Paper Series, 1974.

Howitt et al., "Cellular Ceramic Diesel Particulate Filter", Paper No. 810114, SAE Technical Paper Series, 1981.

*Primary Examiner*—Hien Tran
*Attorney, Agent, or Firm*—Robert W. Sprague; Harold C. Knecht III; Brian E. Szymanski

[57] ABSTRACT

A composite for mounting a catalytic converter or diesel particulate filter. The composite comprises a flexible mat and a layer of an intumescent paste comprising an intumescent material. A catalytic converter element and diesel particulate filter comprising such a composite are also described.

21 Claims, 1 Drawing Sheet

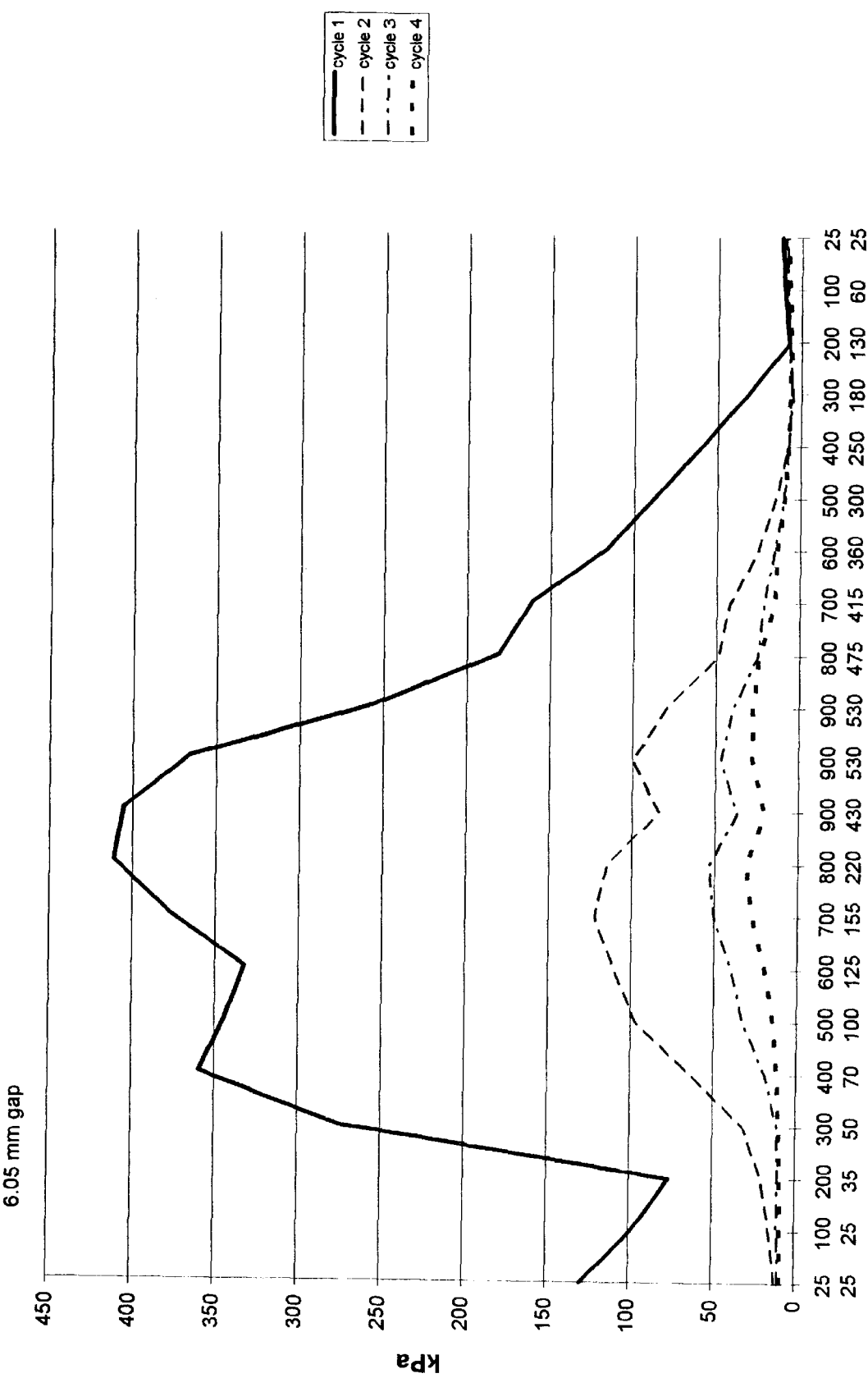

COMPOSITE MOUNTING SYSTEM

FIELD OF THE INVENTION

This invention relates to mounting materials for catalytic converters and diesel particulate filters or traps.

BACKGROUND OF THE INVENTION

Pollution control devices are universally employed on motor vehicles to control atmospheric pollution. Two types of devices are currently in widespread use—catalytic converters and diesel particulate filters or traps. Catalytic converters contain a catalyst, which is typically coated onto a monolithic structure mounted in the converter. The monolithic structures are typically ceramic, although metal monoliths have been used. The catalyst oxidizes carbon monoxide and hydrocarbons, and reduces the oxides of nitrogen in automobile exhaust gases to control atmospheric pollution. Diesel particulate filters or traps are wall flow filters which have honeycombed monolithic structures typically made from porous crystalline ceramic materials.

In the state of the art construction of these devices, each type of these devices has a metal housing which holds within it a monolithic structure or element that can be metal or ceramic, and is most commonly ceramic. The ceramic monolith generally has very thin walls to provide a large amount of surface area and is fragile and susceptible to breakage. It also has a coefficient of thermal expansion generally an order of magnitude less than the metal (usually stainless steel) housing in which it is contained. To avoid damage to the ceramic monolith from road shock and vibration, to compensate for the thermal expansion difference, and to prevent exhaust gases from passing between the monolith and the metal housing, ceramic mat or paste materials are typically disposed between the ceramic monolith and the metal housing. The process of placing or inserting the mounting material is also referred to as canning and includes such processes as injecting a paste into a gap between the monolith and the metal housing, or wrapping a sheet or mat material around the monolith and inserting the wrapped monolith into the housing.

Typically, the mounting materials include inorganic binders, inorganic fibers that may also serve as a binder, intumescent materials, and optionally, organic binders, fillers, and other adjuvants. The materials are used as pastes, sheets, and mats. Ceramic mat materials, ceramic pastes, and intumescent sheet materials useful for mounting the monolith in the housing are described in, for example, U.S. Pat. Nos. 3,916,057 (Hatch et al.), 4,305,992 (Langer et al.), 4,385,135 (Langer et al.), 5,254,410 (Langer et al.), 5,242,871 (Hashimoto et al.), 3,001,571 (Hatch), 5,385,873 (MacNeil), 5,207,989 (MacNeil), and GB 1,522,646 (Wood).

U.S. Pat. No. 4,999,168 (Ten Eyck) describes a crack resistant intumescent sheet having a preformed intumescent layer adhesively bonded to a reinforcing layer of a sheet material such as kraft paper, plastic film, and inorganic fabric.

U.S. Pat. No. 4,865,818 (Merry et al.) describes a method of producing a catalytic converter by wrapping a thin sheet or mat material around the monolith at least twice in a layerwise fashion.

U.S. Pat. No. 4,929,429 (Merry) describes a composite for catalytic converters having a ceramic fiber mat stitch bonded to an intumescent mat material.

U.S. Pat. No. 4,048,363 (Langer et al.) describes a composite having at least two layers of similar sheets of intumescent materials.

While the state of the art mounting materials have their own utilities and advantages, there remains on ongoing need to improve mounting materials in catalytic converters. Additionally, it would be desirable to provide materials that function well over a broader temperature range.

SUMMARY OF THE INVENTION

The invention provides a composite mounting for a catalytic converter element or diesel particulate filter element comprising:

(a) at least one flexible mat; and (b) at least one layer of an intumescent paste or dried intumescent paste sheet comprising at least one unexpanded intumescent material.

The mat is a wet-laid mixture of fibrous materials with or without an unexpanded intumescent material. The paste is a moldable composition comprising inorganic binder and organic binder.

Additional features and advantages of the invention will be set forth in the description which follows, and in part will be apparent from the description, or may be learned by practice of the invention. The objectives and other advantages of the invention will be realized and attained by the methods and articles particularly pointed out in the written description and claims hereof It is to be understood that both the foregoing general description and the following detailed description are exemplary and explanatory and are intended to provide further explanation of the invention as claimed.

BRIEF DESCRIPTION OF THE DRAWINGS

FIG. 1 presents the Real Condition Fixture Test results for Example 1.

DETAILED DESCRIPTION OF THE INVENTION

The present invention provides a mounting composite having at least one layer of a paste composition and at least one layer that is a mat or sheet material wherein at least the paste composition is intumescent. In a preferred embodiment, both the paste composition and the mat or sheet material comprise at least one unexpanded intumescent material. Composites of the invention are useful for protecting fragile monolithic structures in catalytic converters, diesel particulate filters, and high temperature filters. The composite mounting offers the advantage of being able to combine the properties of paste materials and sheet materials. Additionally, each layer of the composite can be formulated to intumescent at a different temperature to extend the useful temperature range of the mounting material.

The paste compositions of the invention include materials that can be formed into flexible sheets. Preferred paste compositions comprise, on a dry weight basis, from about 20% to 60% organic binder, and 80% to 40% inorganic materials. More preferably, the inorganic materials comprise both inorganic binder materials and intumescent materials.

Additionally, the paste composition can preferably include 1 to 70 dry weight percent of the intumescent material, 5 to less than 79 dry weight percent of inorganic binder, and 0 to 70 dry weight percent of one or more fillers.

Suitable organic binder materials include aqueous polymer emulsions, solvent-based polymer solutions, and 100% solids polymers. Aqueous polymer emulsions are organic binder polymers and elastomers in the latex form (e.g., natural rubber latices, styrene-butadiene latices, butadiene-acrylonitrile latices, ethylene vinyl acetate latices, and latices of acrylate and methacrylate polymers and copolymers). Solvent-based polymeric binders include, for example, a polymer such as an acrylic, a polyurethane, or a rubber-based organic polymer in an organic solvent such as toluene, methyl ethyl ketone, heptane, and mixtures thereof The 100% solids polymers include natural rubber, styrene-butadiene rubber, and other elastomers. Acrylic materials are preferred because of their excellent aging properties, slow burn out over the temperature range used, and noncorrosive combustion products.

The organic binder material can include at least one of a tackifier(s), a plasticizer(s), or both. Tackifiers, or tackifying resins can be hydrocarbons or modified rosin esters, and typically provide adhesive-type properties to a polymer. Tackifiers aid in holding the binder and fillers together. Plasticizers tend to soften a polymer matrix and thereby contribute to the flexibility and-moldability of the sheet materials made from the composition. Rheology modifiers can also be included to provide the flow properties desired.

Preferably, the organic binder material includes an aqueous acrylic emulsion. Useful acrylic emulsions include those commercially available under the trade designations "RHOPLEX TR-934" (a 44.5% by weight solids aqueous acrylic emulsion) and "RHOPLEX HA-8" (a 44.5% by weight solids aqueous emulsion of acrylic copolymers) from Rohm and Haas of Philadelphia, Pa. A preferred acrylic emulsion is commercially available under the trade designation "NEOCRYL XA-2022" (a 60.5% solids aqueous dispersion of acrylic resin) from ICI Resins US of Wilmnagton, Mass.

A preferred organic binder material comprises acrylic resin in the range from about 25 to about 50 percent by weight, plasticizer(s) (e.g., such as that commercially available under the trade designation "SANTICIZER 148" (isodecyl diphenyl diphosphate) from Monsanto of St. Louis, Mo.) in the range from about 15 to about 35 percent by weight, tackifier(s) (e.g., rosin tackifier such as that commercially available under the trade designation "SNOWTACK 810A" (a 50% by weight aqueous rosin dispersion; melting point of rosin: 55° C., from Eka Nobel, Inc., of Toronto, Canada) in the range from about 25 to about 50 percent by weight, based on the total weight of the resulting dispersion. These ranges provided a compromise between the desired flexibility of the binder material and minimizing the amount of organic binders which burn out during heating at the temperatures of use.

Suitable inorganic materials include inorganic binders known in the art for such use and include water swellable clays such as montmorillonite (present in major amounts in bentonite, hectorite, and saponite) and kaolinite; water swellable synthetic mica such as tetrasilisic fluorine mica, in either the water-swelling unexchanged form or after flocculation as the exchanged salt with a divalent or polyvalent cation; expanded vermiculite; delaminated vermiculite; and ground expanded vermiculite, which can be prepared, for example, by ball-milling or high shear mixing of unexpanded or expanded vermiculite. The inorganic binder may also comprise ceramic fibers; however, the amount of ceramic fibers must not prevent the paste from being moldable. Preferred inorganic binders include expanded vermiculite and ground expanded vermiculite.

Useful intumescent materials include unexpanded vermiculite, vermiculite ore, expandable graphite, hydrobiotite, water swellable synthetic tetrasilicic fluorine type mica described in U.S. Pat. No. 3,001,571 (Hatch), partially dehydrated vermiculite as described in U.S. Pat. No. 5,151,253 (Merry et al.) and alkali metal silicate granules as described in U.S. Pat. No. 4,521,333 (Graham et al.). Preferred intumescent materials include unexpanded vermiculite, i.e., vermiculite ore, and expandable graphite. The choice of the intumescent materials can vary depending upon the desired end use. For higher temperatures, e.g., above about 500° C., vermiculite materials are suitable since they start to expand at about 340° C. to fill the expanding gap between the expanding metal housing and the monolith in a catalytic converter. For lower temperature use, e.g., below about 500° C., such as in diesel particulate filters, treated graphite may be preferred since it starts to expand at about 210° C. Treated vermiculites are also available; these expand at about 290° C. Blends of various intumescent materials can also be used.

Fillers, in a variety of shapes including particulates and chopped fibers, can be included in the composition. The fibers can be reduced in size by conventional techniques, including dry or wet ball milling. Useful fibers include those made from graphite, silica, alumina-silica, calcium-silica, asbestos, glass, metals, such as Inconel and stainless steel, and polymeric materials such as rayon, polyvinyl alcohol, and acrylic. Commercially available fibers include Inconel fibers (available, for example, under the trade designation "BEKI-SHEMLD GR90/C2/2" from Bekaert Steel Wire Corp. of Atlanta, Ga.). Preferred fibers include glass fibers, metal fibers, and polymeric fibers.

Other suitable fillers include inert materials that are relatively insoluble in water. Such materials include hydrated metal oxides (e.g., alumina and sodium silicate), borates (e.g., boric acid and zinc borate), calcium carbonate, talc, feldspar, silicon carbide, and silica sand.

Other additives that can be included in amounts suitable for their purpose are defoaming agents, surfactants, dispersing agents, fungicides and bactericides. Generally, these types of additives are included in amounts less than about 5% by weight.

In the practice of the invention, the paste composition is made by mixing together the organic binder materials, the inorganic materials, and any fillers to form a moldable composition. Optional water, dispersing agents, tackifiers, bactericides, plasticizers, surfactants, etc., can independently be added to aid in mixing the components together and/or to adjust the viscosity of the mixture. Mixing of the ingredients can be done by any convenient means, including stirring by hand or commercially available mechanical mixers such as mogul mixers and Ross mixers.

The paste compositions can be formed into an organic paste layer on a release liner such as waxed paper. The layer is optionally dried, and then laminated to the sheet or mat layer. The lamination can be done by physically pressing the paste layer onto the sheet or mat layer, or an adhesive can be used to bond the two layers. Suitable adhesives include pressure-sensitive adhesive transfer tapes, spray adhesives, emulsion adhesives such as "Elmers Glue," paste adhesives, and the like. Alternatively, the paste layer can be formed directly on top of the sheet or mat layer.

If the paste layer is tacky due to the organic binders, it may be desirable to dust the exposed paste layer with talc or other finely divided inorganic or organic particles to reduce the tackiness to facilitate handling.

The mat or sheet materials of the invention can be intumescent or non-intumescent. Examples of intumescent sheet materials include those described in U.S. Pat. Nos.

3,916,057 (Hatch et al.), 4,305,992 (Langer et al.), 4,385,135 (Langer et al.), 5,254,410 (Langer et al.), 4,865,818 (Merry et al.), 5,151,253 (Merry et al.), and 5,290,522 (Rogers et al.), each of which are hereby incorporated by reference. Additional intumescent sheet materials are described in the copending applications entitled "INTUMESCENT SHEET MATERIAL", U.S. Ser. No. 08/497,066 (Attorney Docket No. 51746USA3A), "INTUMESCENT SHEET MATERIAL AND PASTE WITH ORGANIC BINDER", U.S. Ser. No. 08/497,671 (Attorney Docket No. 51748USA9A), and "INTUMESCENT SHEET MATERIAL WITH GLASS FIBERS", U.S. Ser. No. 08/497,102 (Attorney Docket No. 51745USA5A), filed on even date herewith and commonly assigned, all of which are incorporated herein by reference. Useful commercially available intumescent sheets and mats includes those sold under the INTERAM™ tradename by Minnesota Mining & Manufacturing Co. of St. Paul Minn.

A suitable intumescent mat comprises, by dry weight percent, 20% to 65% unexpanded vermiculite flakes, 10% to 50% inorganic fibrous material, 3% to 20% organic binders, and up to 40% inorganic fillers. Additionally, the sheet can include other intumescent materials such as expandable graphite.

The unexpanded vermiculite flakes can be either untreated or treated by processes such as by being ion exchanged with an ammonium compound such as ammonium dihydrogen chloride, ammonium carbonate, ammonium chloride, or other suitable ammonium compounds.

Inorganic fibrous materials include aluminosilicate fibers (commercially available under the tradenames Fiberfrax™ from Carborundum Co., Niagara Falls, N.Y., and Cerafiber™ from Thermal Ceramics, Augusta, Ga.), asbestos fibers, soft glass fibers, zirconia-silica fibers, and crystalline alumina whiskers.

Organic binders include those described above such as natural rubber latices, styrene-butadiene latices, butadiene acrylonitrile latices, and latices of acrylate and methacylate polymers and copolymers.

Inorganic fillers include expanded vermiculite, hollow glass microspheres, and bentonite. Preferably, the inorganic fillers are expanded vermiculite.

Non-intumescent materials sheet or mat layers include ceramic mats and papers. Suitable ceramic papers include Fiberfrax™ 880, available from Carborundum Co., and Saffil LD, available from ICI Chemicals & Polymers, Widness, Cheshire, U.K.

The mats can be made by commonly known paper making techniques on equipment such as Fourdrinier machines. Mats can also be formed by blowing the fibrous material onto a collection screen as is practiced in the nonwoven industry.

The layers of the composites can be formulated to suit the end purpose. For example, a composite can comprise a paste layer with materials that intumescent at a lower temperature than the intumescent materials of the mat. With this concept, the paste side can be mounted against the monolith and it would expand at a lower temperature to provide a holding force at those temperatures. The combination of higher and lower temperature intumescing materials better facilitates holding of a monolith in place in a catalytic converter over the an extended temperature range.

Additionally, the composite sheets of the invention can further include edge protection materials. Suitable materials include a stainless steel wire screen wrapped around the edges as described in U.S. Pat. No. 5,008,086 (Merry), incorporated herein by reference, and braided or rope-like ceramic (i.e., glass, crystalline ceramic, or glass-ceramic) fiber braiding or metal wire material as described in U.S. Pat. No. 4,156,333 (Close et al.), incorporated herein by reference. Edge protectants formed can also be formed from compositions having glass particles as described in EP 639 701 A1 (Howorth et al.), EP 639 702 Al (Howorth et al.), and EP 639 700 A1 (Stroom et al.), all of which are incorporated herein by reference.

In another aspect, the invention provides a catalytic converter or a diesel articulate filter using the mounting material of the invention. A catalytic converter or diesel particulate filter generally comprises a housing, a monolithic structure or element(s), and a mounting material disposed between the structure and the housing to hold the structure in place.

The housing, which is also referred to as a can or a casing, can be made from suitable materials known in the art for such use and is typically made of metal. Preferably, the housing is made of stainless steel.

Suitable catalytic converter elements, also referred to a monoliths, are known in the art and include those made of metal or ceramic. The monoliths or elements are used to support the catalyst materials for the converter. A useful catalytic converter element is disclosed, for example, in U.S. Pat. No. RE 27,747 (Johnson).

Ceramic catalytic converter elements are commercially available, for example, from Corning Inc. of Corning, N.Y., and NGK Insulator Ltd. of Nagoya, Japan. For example, a honeycomb ceramic catalyst support is marketed under the trade designation "CELCOR" by Corning Inc. and "HONEYCERAM" by NGK Insulator Ltd. Metal catalytic converter elements are commercially available from Behr GmbH and Co. of Germany.

For additional details regarding catalytic monoliths see, for example, "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974.

The catalyst materials coated onto the catalytic converter elements include those known in the art (e.g., metals such as ruthenium, osmium, rhodium, iridium, nickel, palladium, and platinum, and metal oxides such as vanadium pentoxide and titanium dioxide). For further details regarding catalytic coatings see, for example, U.S. Pat. No. 3,441,381 (Keith et al.).

Conventional monolithic type diesel particulate filter elements are typically wall flow filters comprised of honeycombed, porous, crystalline ceramic (e.g., cordierite) material. Alternate cells of the honeycombed structure are typically plugged such that exhaust gas enters in one cell and is forced through the porous wall of one cell and exits the structure through another cell. The size of the diesel particulate filter element depends on the particular application needs. Useful diesel particulate filter elements are commercially available, for example, from Corning Inc. of Corning, N.Y., and NGK Insulator Ltd. of Nagoya, Japan. Useful diesel particulate filter elements are discussed in "Cellular Ceramic Diesel Particulate Filter," Howitt et al., Paper No. 810114, SAE Technical Paper Series, 1981.

In use, the mounting materials of the invention are disposed between the monolith and the housing in similar fashion for either a catalytic converter or for a diesel particulate filter. This may be done by wrapping the monolith with a sheet of the mounting material, inserting the wrapped monolith into the housing, and sealing the housing.

Objects and advantages of this invention are further illustrated by the following examples, but the particular materials and amounts thereof recited in these examples, as well as other conditions and details, should not be construed to unduly limit this invention. All parts and percentages are by weight unless stated otherwise.

TEST METHODS

Real Condition Fixture Test (RCFT)

The RCFT is a test used to measure the pressure exerted by the mounting material under conditions representative of actual conditions found in a catalytic converter during normal use.

Two 50.8 mm by 50.8 mm heated platens, controlled independently, are heated to different temperatures to simulate the metal housing and monolith temperatures, respectively. Simultaneously, the space or gap between the platens is increased by a value calculated from the temperature and thermal expansion coefficients of a typical catalytic converter. The temperatures of the platens and the gap change are presented in Table 1 below. The force exerted by the mounting material is measured by a Sintech ID computer-controlled load frame with Extensometer (MTS Systems Corp., Research Triangle Park, N.C.).

TABLE 1

| Top Platen Temperature (°C.) | Bottom Platen Temperature (°C.) | Gap Change (mm) |
|---|---|---|
| 25 | 25 | 0 |
| 50 | 25 | 0 |
| 100 | 30 | 0 |
| 150 | 33 | 0 |
| 200 | 35 | 0 |
| 250 | 38 | 0 |
| 300 | 40 | 0 |
| 350 | 45 | 0 |
| 400 | 50 | 0 |
| 450 | 60 | 0 |
| 500 | 70 | 0 |
| 550 | 85 | 0.0127 |
| 600 | 100 | 0.0254 |
| 650 | 125 | 0.0381 |
| 700 | 150 | 0.0508 |
| 750 | 185 | 0.0762 |
| 800 | 220 | 0.1016 |
| 850 | 325 | 0.1651 |
| 900 | 430 | 0.2286 |
| 900 | 480 | 0.2667 |
| 900 | 530 | 0.3048 |
| 850 | 502 | 0.2921 |
| 800 | 474 | 0.2794 |
| 750 | 445 | 0.2540 |
| 700 | 416 | 0.2286 |
| 650 | 387 | 0.2159 |
| 600 | 358 | 0.2032 |
| 550 | 329 | 0.1905 |
| 500 | 300 | 0.1778 |
| 450 | 275 | 0.1651 |
| 400 | 250 | 0.1524 |
| 350 | 210 | 0.1270 |
| 300 | 180 | 0.1016 |
| 250 | 155 | 0.0889 |
| 200 | 130 | 0.0762 |
| 150 | 95 | 0.0508 |
| 100 | 60 | 0.0254 |
| 50 | 43 | 0.0127 |
| 25 | 25 | 0 |

EXAMPLE 1

Part A of an intumescent paste composition was prepared by adding 3003 grams of expanded vermiculite (Zonalite #5, available from W.R. Grace Co., Cambridge, Mass.), 2000 grams water, 2,896 grams of 60.5% solids acrylic latex (Neocryl™ 2022, available from Zeneca Resins, Wilmington, Mass.), and 16 grams bactericide (Busan™ 1024, available from Bucklnan Laboratories, Memphis, Tenn.) to a Ross mixer which included both a planetary blade and a high shear dispersing blade (Model PD 4 Mixer, available from Charles Ross & Son Co., Hauppauge, N.Y.). The mixer was sealed and placed under a vacuum of 15 inches of mercury (in. Hg), (50.7 kiloPascals (kPa)). The material was mixed for twenty minutes with both the planetary and dispersing blade speeds set at 20 on the control panel. After bleeding air into the vacuum and opening the mixer, 6,237 grams of tabular alumina (−48+200 mesh Alumina, Alcoa, Bauxite, AR), and 1,944 grams of grams of plasticizer (Sanitisizer™ 148, available from Monsanto Co., Bridgeport, N.J.) were added to the batch. The mixer was sealed, placed under a vacuum of 15 in. Hg (50.7 kPa), and the batch was mixed for an additional 20 minutes using planetary and dispersing blade speeds set at 20. After bleeding air into the vacuum and opening the mixer, 2,896 grams of tackifier (Snowtack™ 810A, available from Eka Nobel Canada, Inc., Toronto, ONT) and 6,362 grams of vermiculite ore (obtained from Cometals, Inc., New York, N.Y.) were added to the batch. Again, the mixer was sealed and placed under a vacuum of 15 in. Hg (50.7 kPa). The batch was mixed for an additional 20 minutes using planetary and dispersing blade speed settings of 20. After bleeding air into the vacuum, the mixer was opened and the resulting composition was placed in a sealed 5 gallon (18.9 liter) plastic container. The composition, on a dry weight basis, was approximately 30.6% intumescent agent, 8.4% acrylic polymer, 9.4% plasticizer, 7.1% tackifier, 14.4% inorganic binder, 0.08% bactericide, and 30% filler (alumina).

Part B of an intumescent paste composition was prepared by mixing 5 grams of expanded vermiculite (Zonolite™ Vermiculite #5), 41.7 grams of 60.5% solids acrylic latex (Neocryl™ 2022), 41.7 grams of tackifier (Snowtack™ 810A), 27.9 grams of plasticizer (Sanitisizer™ 148), and 31.5 grams of expandable graphite (Product Number 533-61-26, from Ucar Carbon Co., Danbury, Conn.) in a beaker by hand.

An intumescent paste composition was then prepared by mixing 25 parts of Part A and 75 parts of Part B. The resulting composition was cast onto a sheet of waxed paper at a thickness of about 3.2 mm to form a paste layer. The paste layer was dried overnight in a convection oven set at 95° C.

An intumescent mounting composite was prepared by lightly spraying a spray adhesive (Shipping-Mate™ Case Sealing Adhesive, available from Minnesota Mining & Manufacturing Co., St. Paul Minn.) onto the surface of an intumescent mat (Type 100 Interam™ brand Automotive Mounting Mat, 3100 g/m$^2$, available from Minnesota Mining & Manufacturing Co.) and laminating the paste layer to the mat. The composite sheet was tested for holding strength under the Real Condition Fixture Test described above. Test results, shown in FIG. 1, indicate that the composite exerts sufficient pressure to secure a monolith in a casing over the useful temperature range.

It will be apparent to those skilled in the art that various modifications and variations can be made in the method and article of the present invention without departing from the spirit or scope of the invention. Thus, it is intended that the present invention cover the modifications and variations of this invention provided they come within the scope of the appended claims and their equivalents.

What is claimed is:

1. A pollution control device comprising:
   (a) a housing;
   (b) pollution control element disposed within said housing; and
   (c) a composite mounting element disposed between said housing and said pollution control element, said composite mounting element comprising a flexible mat and, laminated or adhered thereto, a layer formed of an intumescent paste comprising an intumescent material and about 20 to 60 dry weight percent of organic binder wherein the flexible mat and the layer expand at different temperatures.

2. The pollution control device of claim 1, wherein said flexible mat comprises at least one intumescent material.

3. The pollution control device of claim 2, wherein said at least one intumescent material comprises a material selected from the group consisting of an unexpanded vermiculite and expandable graphite.

4. The pollution control device of claim 1, wherein said intumescent material comprises one or more materials selected from the group consisting of an unexpanded vermiculite, vermiculite ore, hydrobiotite, water swellable synthetic tetrasilicic fluorine mica, partially dehydrated vermiculite, alkali metal silicate granules, and expandable graphite.

5. The pollution control device of claim 1, wherein more than one layer formed of the intumescent paste is laminated or adhered to the flexible mat.

6. The pollution control device of claim 2, wherein said flexible mat comprises 25 to 60 dry weight percent of at least one intumescent material and 25 to 60 dry weight percent of ceramic fibers.

7. The pollution control device of claim 6, wherein said flexible mat further comprises an organic binder.

8. The pollution control device of claim 2, wherein said flexible mat comprises an organic binder.

9. The pollution control device of claim 1, wherein said layer includes 1 to 70 dry weight percent of the intumescent material.

10. The pollution control device of claim 1, wherein said layer includes fibers.

11. The pollution control device of claim 1, wherein said layer is in a dried condition.

12. The pollution control device of claim 1, wherein the pollution control element is selected from the group consisting of a catalytic converter and a diesel particulate filter.

13. The pollution control device of claim 1, wherein the flexible mat includes an intumescent material.

14. The pollution control device of claim 13, wherein the flexible mat and the layer intumescent at different temperatures.

15. The pollution control device of claim 1, wherein the layer is positioned between the pollution control element and the flexible mat.

16. The pollution control device of claim 1, wherein the organic binder includes a plasticizer.

17. The pollution control device of claim 1, wherein the organic binder includes a tackifier.

18. The pollution control device of claim 1, wherein the organic binder comprises about 15 to about 35 percent by weight plasticizer and about 25 to about 50 percent by weight tackifier.

19. The pollution control device of claim 1, wherein the organic binder includes a rheology modifier.

20. The pollution control device of claim 9, wherein said layer further comprises 5 to less than 79 dry weight percent of inorganic binder, and 0 to 70 dry weight percent of one or more fillers.

21. A pollution control device comprising:
   (a) a housing;
   (b) pollution control element disposed within said housing; and
   (c) a composite mounting element disposed between said housing and said pollution control element, said composite mounting element comprising a flexible mat containing an intumescent material, and a layer, laminated or adhered to said flexible mat, formed of an intumescent paste comprising an intumescent material and about 20 to 60 dry weight percent of organic binder, wherein said flexible mat and said layer intumescent at different temperatures.

* * * * *

UNITED STATES PATENT AND TRADEMARK OFFICE
CERTIFICATE OF CORRECTION

PATENT NO. : 5,853,675
DATED : December 29, 1998
INVENTOR(S) : Gary F. Howorth

It is certified that error appears in the above-identified patent and that said Letters Patent is hereby corrected as shown below:

Column 10, line 9, "intumescent" should read --intumesce--; and

Column 10, lines 40-41, "intumescent" should read --intumesce--.

Signed and Sealed this

Sixth Day of July, 1999

Attest:

Q. TODD DICKINSON

*Attesting Officer*  *Acting Commissioner of Patents and Trademarks*